United States Patent [19]

McNally

[11] Patent Number: 4,470,109
[45] Date of Patent: Sep. 4, 1984

[54] REAL-TIME DATA SAMPLING WITH MEMORY SHARING BY HIGH SPEED I/O PROCESSOR AND CYCLE STEALING SUPPORT PROCESSOR

[75] Inventor: Guy W. W. McNally, Byfleet, England

[73] Assignee: British Broadcasting Corporation, London, England

[21] Appl. No.: 307,251

[22] Filed: Sep. 30, 1981

Related U.S. Application Data

[63] Continuation of Ser. No. 23,709, Mar. 26, 1979, abandoned.

[30] Foreign Application Priority Data

Mar. 29, 1978 [GB] United Kingdom ............... 1229578

[51] Int. Cl.³ ............................................. G06F 15/16
[52] U.S. Cl. ............................................... 364/200
[58] Field of Search ... 364/200 MS File, 900 MS File

[56] References Cited

U.S. PATENT DOCUMENTS

| | | | |
|---|---|---|---|
| 4,107,773 | 8/1978 | Gilbreath et al. | 364/200 |
| 4,110,823 | 8/1978 | Cronshaw et al. | 364/200 |
| 4,153,942 | 5/1979 | Gregory | 364/900 |
| 4,212,057 | 7/1980 | Devlin et al. | 364/200 |
| 4,257,095 | 3/1981 | Nadir | 364/200 |

*Primary Examiner*—James D. Thomas
*Assistant Examiner*—Archie E. Williams, Jr.
*Attorney, Agent, or Firm*—Robert F. O'Connell

[57] ABSTRACT

A digital data processor comprises a high speed processor (50) having input ports (52) and output ports (54), a memory (56), and a slow speed support processor (58), the memory being accessible to both the high speed and slow speed processors. The high speed processor can effect processing in dependence upon parameters written into the memory by the slow speed processor and which may have been derived by analyzing data supplied to the slow speed processor from the high speed processor via the memory.

11 Claims, 1 Drawing Figure

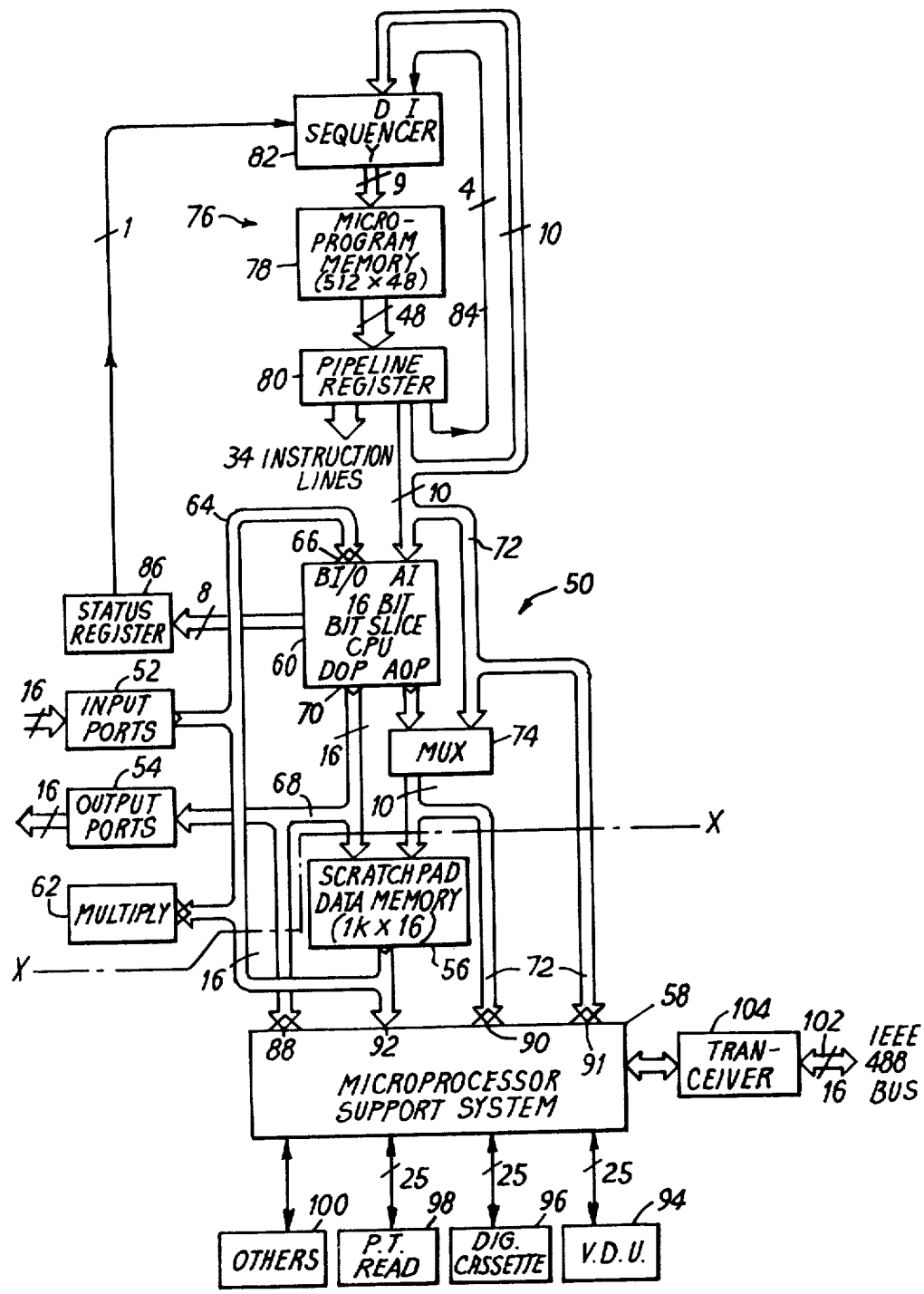

REAL-TIME DATA SAMPLING WITH MEMORY SHARING BY HIGH SPEED I/O PROCESSOR AND CYCLE STEALING SUPPORT PROCESSOR

This is a continuation of application Ser. No. 23,709, filed Mar. 26, 1979, now abandoned.

Introduction

This invention relates to data processing apparatus and to a method of digital data processing which is particularly suitable for processing digital audio signals in real time.

Background of the Invention

In processing high quality audio signals it is a requirement that the signal is produced continuously without interruption although fairly complex operations may need to be performed on the data and, in particular, it may be required to analyse the data to obtain control parameters for use in those operations. The processing requirements are thus extremely arduous in that a very large processor is required which can work at very high speed.

This invention is concerned to provide some reduction in these problems.

Brief Summary of the Invention

According to the invention there is provided a digital data processor, comprising at least one data input and at least one data output, a high speed digital processor connected between the data input and data output for performing processing operations on the data, a slow speed processor for performing support operations in respect of the data, and a common memory section accessible to and by both the high speed processor and the slow speed processor.

The invention also provides a method of processing digital data, particularly digital audio signals, comprising real-time processing the data at high speed, carrying out support operations in respect of the data at slow speed, and transferring data between the real-time and support processing via a common memory section.

Brief Description of the Drawing

The invention will now be described in more detail, by way of example, with reference to the drawing, in which the sole FIGURE shows a block diagram of a digital data processor embodying the invention.

Description of the Preferred Embodiment

The data processor illustrated includes a high speed processor 50 which may be regarded as being the part of the apparatus above the chaindotted line x-x in the FIGURE, and which has input ports 52 and output ports 54 for receiving and supplying data. A scratchpad data memory 56 is connected to the high speed processor 50 and also to a slow speed processor 58 in the form of a microprocessor. The memory 56 is common to the high speed processor 50 and support processor 58 in that both processors have access to the data in the memory and both processors can write data in the memory.

The construction of the high speed processor will now be described. The heart of the processor is a central processing unit (CPU) 60 which is formed by four 'bit-slices' of four bits each. These are readily available devices which each contain the processing circuitry for four bits of data together with its instruction set; one example is Texas Instruments circuit No. 74S481. A separate high-speed multiplier 62 is included because the speed of the multiply function in the 74S481 is too slow. In one example, processor 50 operated with 16 bit samples at a 32 KHz sample rate, though a higher sampling rate could be used. Between sampling pulses at this rate there are 192 machine cycles, and the multiplier 62 can undertake a 16 bit multiplication is one 160 ns cycle.

There are three main connecting buses in the system. A first bus 64 is connected to a bidirectional input/output port 66 on the CPU 60 and also to the input ports 52, the output of the scratchpad memory 56, and an input of the support processor 58. A second data bus 68 is connected to a data output port 70 on the CPU 60 and enables data to be written into the scratchpad memory 56 or to the output ports 54 or supplied to the support processor 58, without inteferring with the first bus 64. Finally an address bus 72 is provided which feeds addresses to the CPU 60, to the support processor 58, and, via a multiplexer 74, to the scratchpad memory 56. The address bus is sourced either by a program control system 76 or by a counter in the CPU 60.

The program control system generally referenced 76 includes a microprogram memory store 78 which contains machine code instructions in the form of 48 bit microinstructions which control the processor to perform the desired operations. A separate "pipeline" register 80 is provided for holding the 'current' microinstruction to allow a sequencer 82 to be selecting the next microinstruction while the current instruction is being executed. For this purpose the sequencer is connected to the address bus 72 and also receives a next address control signal over a line 84 from the pipeline register 80. The sequencer also receives a CPU status signal from a status register 86 coupled to the CPU 60.

The sequencer 82 could at its simplest take the form of a simple counter which increments on each machine clock cycle, but it is preferred to use a sequencer which permits conditional branching, and nesting of subroutines and has an independent loop counter. Conditional branching makes use of the line 84 from the pipeline register to branch to an address supplied from the previous instruction in the pipeline register 80 over address bus 72, or continue with the next instruction in the memory 78.

The remaining 34 instruction bits in the pipeline register control the various components of the system by means of control lines which are not shown in the FIGURE for purposes of simplification. The principal operations to be controlled are:

(i) Functions of the multiplier 62.
(ii) Arithmetic/logical (ALU) functions of the CPU 60.
(iii) Data entry and output between the CPU and the data buses.
(iv) Data addressing from the pipeline register or the CPU memory.
(v) Testing the previous ALU operation (for conditional branching).
(vi) Reading data from input ports or memory and writing data to output ports or memory.
(vii) Selection of the next program address.

The support processor system 58 will now be described. It has already been mentioned that the support processor is connected to the second data bus 68, this is through a high speed bidirectional interface 88. The processor 58 is also connected to the address bus system 72 through a high-speed bidirectional port 90 and a slower input 91. The processor 58 is connected to the first data bus 64 by use of an input port 92 on the microprocessor.

The processor 58 has other input/output ports connected to various peripheral units, for example a visual display unit 94, a digital cassette unit 96, a punched tape reader 98, and other units indicated at 100 which may for example be specific user controls on a terminal unit. Programs can be entered either manually or from the tape reader or the digital cassette unit.

The microprocessor support system 58 is capable of connection with one or more identical data processors of the type shown in the FIGURE by means of a bus 102 which can conveniently be of standard IEEE 488 form. The processor 58 is coupled to the bus by a transceiver 104. An executive controller is then required to control the separate processors in the array. The support processor 58 generates timing pulses such as for loading the microprogram memory or driving the paper tape reader control lines. The processor 58 also performs all necessary initialisation of registers on power-up (switch-on) or reset. Firstly the support processor 58 is itself initialised, and then by support processor takes control of the data and address buses to drive the high-speed processor into a suitable initial condition. This overcomes the problem of the microprogram memory 78 and internal registers in the machine containing random data on start-up.

The main components of one data processor of the type shown in the FIGURE were as follows:

| Support Processor 58 | Intel 8085 |
|---|---|
| Scratchpad memory 56 | Fairchild 93425A |
| Multiplier 62 | TRW MPY16AJ |
| CPU 60 | Four of: Texas Instruments 74S481 |
| Status Register 86 | Advanced MicroDevices 25LS2535 |
| Sequencer 82 | Advanced MicroDevices 2910 |
| Microprogram Memory 78 | Fairchild 93422 |
| Transceiver 104 | Motorola 3448 |

The operation of the system illustrated will now be described. It will first be seen that data can be transferred between the high speed processor 50, the scratchpad memory 56 and the support processor 58. That is to say data can be routed into the memory 56 from the CPU 60 via bus 68 and from the memory 56 to the support processor 58 first via bus 64 to the CPU 60 and then via the bus 68. This provides for faster data transfer than would be obtained by direct transfer through the microprocessor input port 92. Data can flow in the other direction, from the support processor 58 to the memory 56 via the bus 68, and from the memory 56 to the CPU via the bus 64.

Thus there is a shared area of memory accessible to both processors 50 and 58. The support processor is not fast enough to take an active role in the real-time audio processing, but it can assist in providing support functions my making use of the scratchpad memory 56. The data and address buses 64, 68 and 72 are normally under the control of the high speed processor but are relinquished for one machine cycle of each sample period so as to be available to the support processor to allow data transfer between the scratchpad memory 56 and the support processor. The machine cycle which is used for this purpose also synchronises the program of the high speed processor to the audio sampling pulses, and so there is no time penalty in using it for other purposes. The high speed processor signals the coming of this machine cycle by means of an interrupt signal applied to the support processor which then sets up the data and addresses at its ports 88 and 90.

One example of the use of the processor will now be given. Assume that the high speed processor is to operate as a digital transversal filter. The filter coefficients required, which may number 64, can be stored in the scratchpad memory 56. The support processor 58 has access to a library of coefficients stored in its own memory or entered externally, and also can be controlled by external selector switches. The support processor can examine the switches to determine the coefficient set required and then write the necessary coefficients in the scratchpad memory. All this happens at a relatively leisurely speed while the high speed processor 50 continues to run without interruption. In this way the high speed processor reserves all its processing power for the real-time audio processing.

The system can be further developed if it is now assumed that an adaptive filter is being simulated. For this purpose the high speed processor will now periodically write a block of input data into the scratchpad memory 56. The support processor 58 can examine this data, for example it could take the Fourier Transform of the data to give a frequency spectrum. It can then locate the maximum frequency component and select a set of weighting coefficients which will provide the filter with a pass band centered on that frequency component. Thus the change of processing parameters is achieved without interrupting the high speed processing and without the need for large high-speed support processing capability.

Examples of other processing operations which can be achieved are pitch changing, producing reverberation effects, mixing or fading two or more inputs, companding, and program monitoring, e.g. level monitoring.

I claim:

1. A digital data processor, for real-time processing of data samples, comprising:
   at least one data input adapted to receive input digital data samples;
   at least one data output adapted to output processed digital data samples;
   a first processor coupled between said data input and data output for performing processing operations on the data and adapted to operate with a plurality of machine cycles for each input data sample;
   a second processor for performing support operations in respect of the data;
   control input means connected to the second processor for input of control information;
   a common memory section accessible to and by both said first processor and said second processor;
   data bus means connecting said processors and said memory for transferring data therebetween;
   address bus means connected to said processors and said memory for addressing appropriate memory locations; and
   said first processor including program control means for controlling the operation of said processor and for providing addresses on said address bus means;
   means connecting said processors whereby said first processor signals to said second processor the coming of one predetermined machine cycle between input samples, during which cycle said first processor relinguishes control of said address and data bus means and carries out operations not requiring access to said common memory section;

wherein said second processor is adapted to control said address bus means and said data bus means for said predetermined machine cycle whereby data can be transferred between said common memory section and said first processor without interrupting the processing performed by said first processor.

2. A data processor according to claim 1, wherein the second processor is provided with one or more peripheral input/output units.

3. A digital data processor as claimed in claim 1, in which said first processor is arranged to carry out, during said predetermined machine cycles, synchronization of sampling pulses for generation of said samples.

4. A digital data processor as claimed in claim 1, in which said first processor provides an interrupt signal to said second processor to indicate the coming of the said predetermined machine cycle.

5. A digital data processor as claimed in claim 1, in which said data bus means comprises a first data bus connecting a bidirectional port on said first processor, and an output port on said memory, and a second data bus connecting a bidirectional port on said second processor, an output port on said first processor, and an input port on said memory.

6. A digital data processor as claimed in claim 5, including a high speed multiplier connected to said first data bus.

7. A digital data processor as claimed in claim 5, in which said first data bus is connected to said data input of said second processor and said second data bus is connected to said data output of said second data processor.

8. A digital data processor, comprising:
at least one data input adapted to receive input digital data samples;
at least one data output adapted to output processed digital data samples;
a high speed digital processor coupled between said data input and data output for performing processing operations on the data and adapted to operate with a plurality of machine cycles for each input data sample;
a relatively-slow speed processor for performing support operations in respect of the data in accordance with control inputs thereto;
a common memory section accessible to and by both said high speed processor and said slow speed processor;
data bus means connecting said processors and said memory for transferring data therebetween; and
address bus means connected to said processors and said memory for addressing appropriate memory locations;
wherein said data bus means comprises a first data bus and a second data bus, said first data bus connecting:
a bidirectional port on said high speed processor;
an output port on said memory; and
said data input of said data processor; and said second data bus connecting:
a bidirectional port on said slow speed processor;
an output port on said high speed processor;
an input port on said memory; and
said data output of said data processor.

9. A digital data processor as claimed in claim 8, in which data is always transferred from said slow speed processor to said high speed processor through said memory.

10. A digital data processor as claimed in claim 1 wherein said input data samples and said output processed digital data samples are digital audio signal data samples.

11. A digital data processor as claimed in claim 8 wherein said input data samples and said output processed digital data samples are digital audio signal data samples.

* * * * *